(12) United States Patent
Hirose et al.

(10) Patent No.: US 10,569,931 B2
(45) Date of Patent: Feb. 25, 2020

(54) VIBRATION ISOLATOR

(71) Applicant: MURATA MACHINERY, LTD., Kyoto-shi, Kyoto (JP)

(72) Inventors: Shingo Hirose, Inuyama (JP); Osamu Fukuta, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 71 days.

(21) Appl. No.: 15/674,556

(22) Filed: Aug. 11, 2017

(65) Prior Publication Data
US 2018/0065777 A1    Mar. 8, 2018

(30) Foreign Application Priority Data
Sep. 7, 2016  (JP) .................. 2016-174477

(51) Int. Cl.
| | |
|---|---|
| *B65D 21/02* | (2006.01) |
| *F16M 11/04* | (2006.01) |
| *B65D 81/02* | (2006.01) |
| *F16F 15/06* | (2006.01) |
| *F16F 15/08* | (2006.01) |

(52) U.S. Cl.
CPC ......... *B65D 21/0224* (2013.01); *B65D 81/02* (2013.01); *F16F 15/06* (2013.01); *F16F 15/085* (2013.01); *F16M 11/045* (2013.01); *F16M 11/048* (2013.01); *F16M 2200/08* (2013.01)

(58) Field of Classification Search
CPC ..... B65D 21/0224; B65D 81/02; F16F 15/06; F16F 15/085; F16M 11/045; F16M 11/048; F16M 2200/08
See application file for complete search history.

(56) References Cited

U.S. PATENT DOCUMENTS

| | | | | |
|---|---|---|---|---|
| 1,010,801 | A * | 12/1911 | Rapp .................. | B65D 21/0215 206/511 |
| 1,980,136 | A * | 11/1934 | Howe ....................... | B61F 5/50 248/566 |
| 2,093,930 | A * | 9/1937 | Rosenzweig ......... | F16F 15/067 248/619 |
| 2,281,955 | A * | 5/1942 | Rosenzweig ........... | F16F 15/06 248/568 |
| 2,660,387 | A * | 11/1953 | Roy ....................... | F16F 1/3615 248/574 |

(Continued)

FOREIGN PATENT DOCUMENTS

| | | |
|---|---|---|
| EP | 0 767 113 B1 | 7/2002 |
| JP | 2001-140981 A | 5/2001 |
| JP | 2015-098334 A | 5/2015 |

*Primary Examiner* — Anita M King
(74) *Attorney, Agent, or Firm* — Keating & Bennett, LLP

(57) ABSTRACT

A vibration isolator includes an upper member, a lower member, moving mechanisms, and an elastic member. The upper member has a first storage container placed thereon. The lower member is placed on a floor surface or on an upper side of a second storage container. The moving mechanisms make the upper member movable relative to the lower member from a position of origin in a horizontal direction. The elastic member makes the upper member return to the position of origin by an elastic force responsive to a moving amount of the upper member from the position of origin in the movement of the upper member relative to the lower member.

14 Claims, 9 Drawing Sheets

(56) References Cited

U.S. PATENT DOCUMENTS

| | | | | | |
|---|---|---|---|---|---|
| 2,912,212 | A | * | 11/1959 | Lowe | F16F 15/06 248/573 |
| 2,973,931 | A | * | 3/1961 | Brown | B65D 19/0012 108/53.3 |
| 3,119,357 | A | * | 1/1964 | Kirsch | B61D 45/008 108/57.12 |
| 4,226,192 | A | * | 10/1980 | Myers | B65D 19/0018 108/53.1 |
| 4,240,360 | A | * | 12/1980 | Sanders | B65D 19/0012 108/53.3 |
| 4,383,611 | A | * | 5/1983 | Kreeger | B65D 21/041 206/505 |
| 4,599,834 | A | * | 7/1986 | Fujimoto | E02D 27/34 376/285 |
| 5,186,338 | A | * | 2/1993 | Boutet | G03B 42/045 108/53.1 |
| 6,418,862 | B1 | * | 7/2002 | Heil | B65D 19/0028 108/57.12 |
| 7,658,285 | B2 | * | 2/2010 | Hagan, III | B65D 19/0095 108/55.5 |
| 8,789,806 | B2 | * | 7/2014 | Taylor | F16F 15/067 248/562 |
| 9,284,107 | B2 | * | 3/2016 | Schultz | F16F 15/067 |
| 2007/0221102 | A1 | * | 9/2007 | Reinhall | B65D 19/0073 108/57.12 |

\* cited by examiner

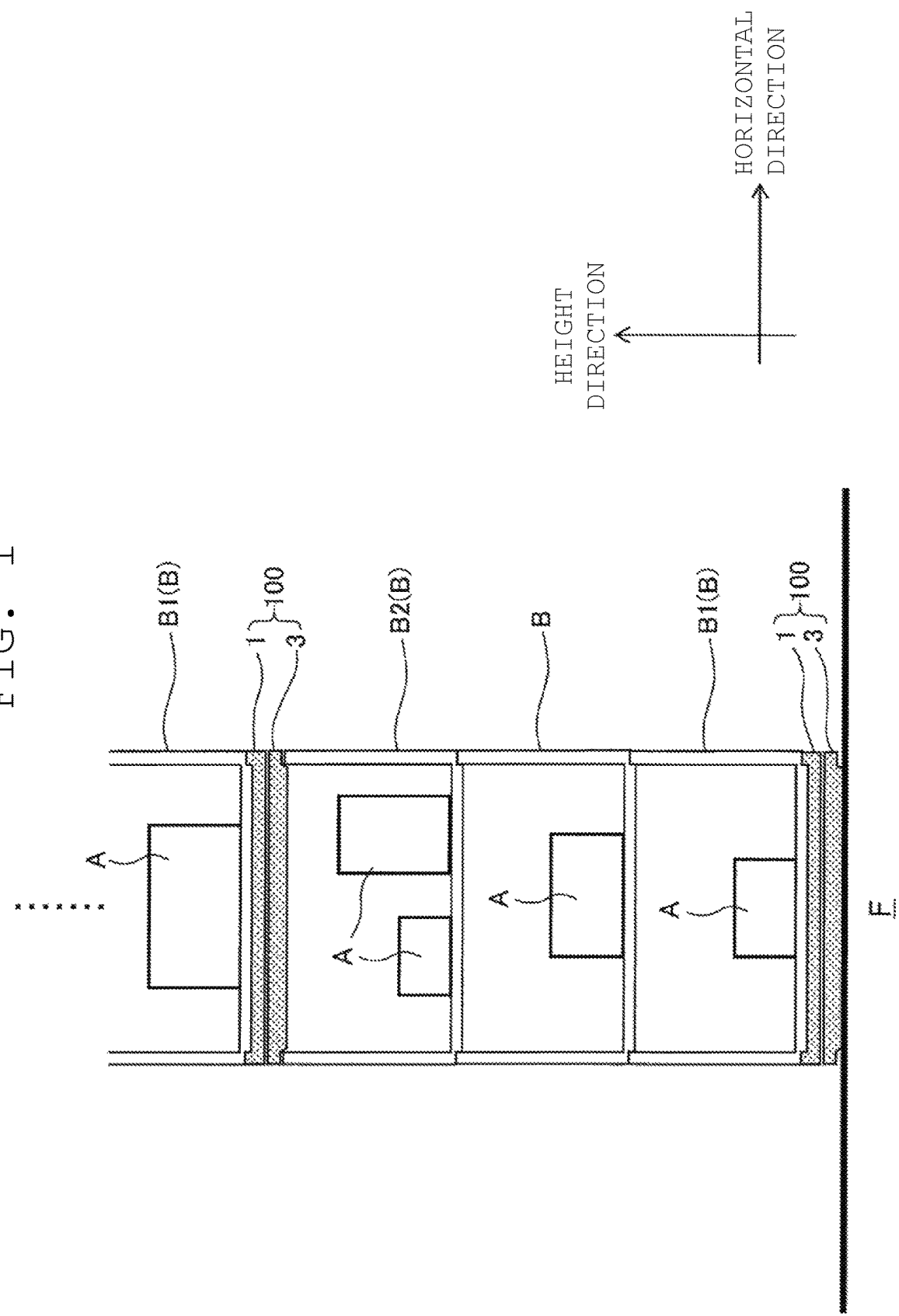

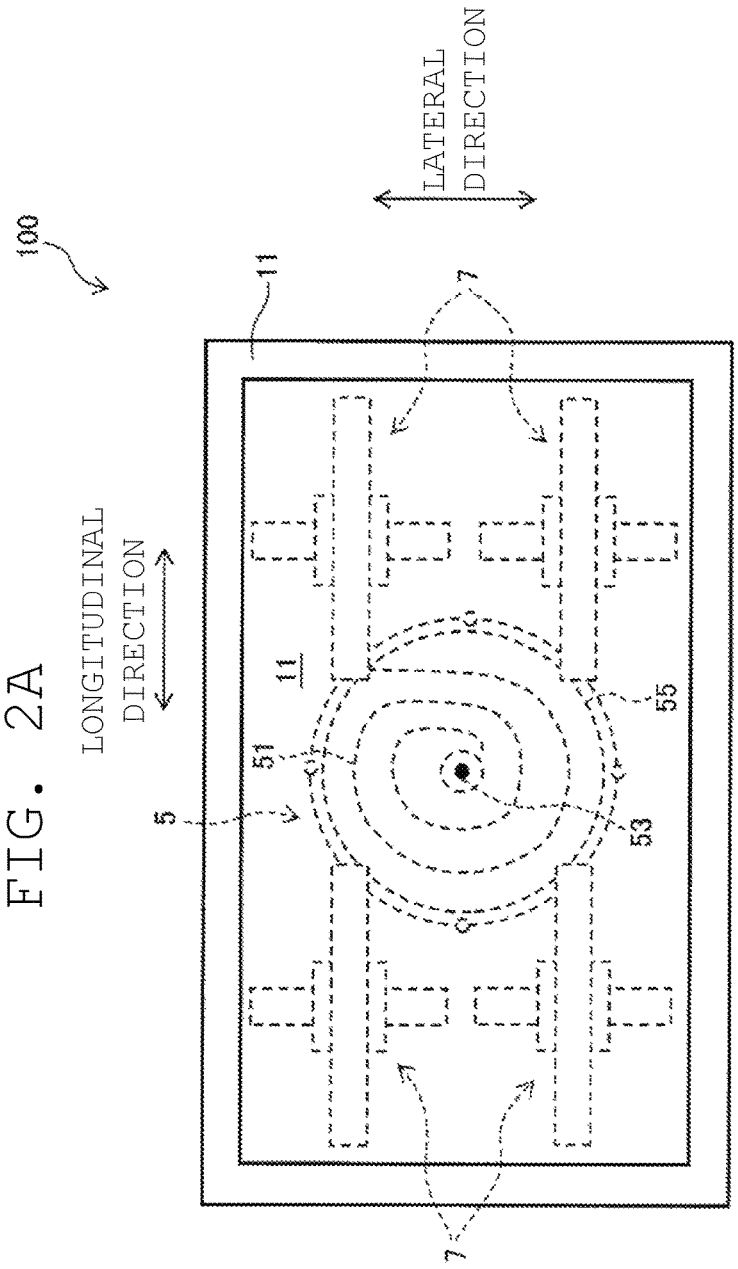
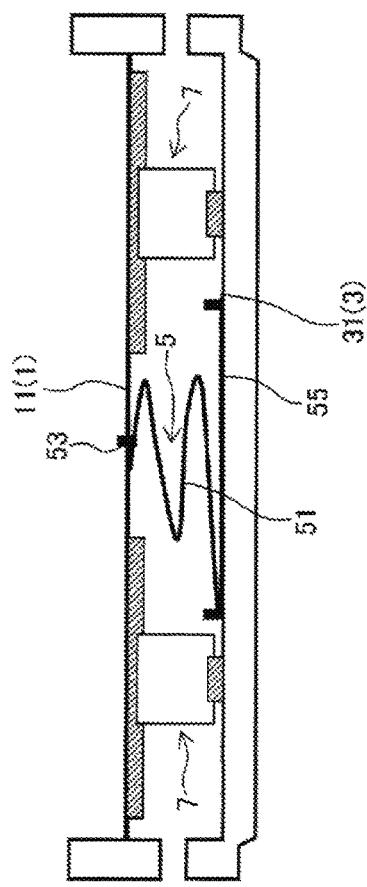

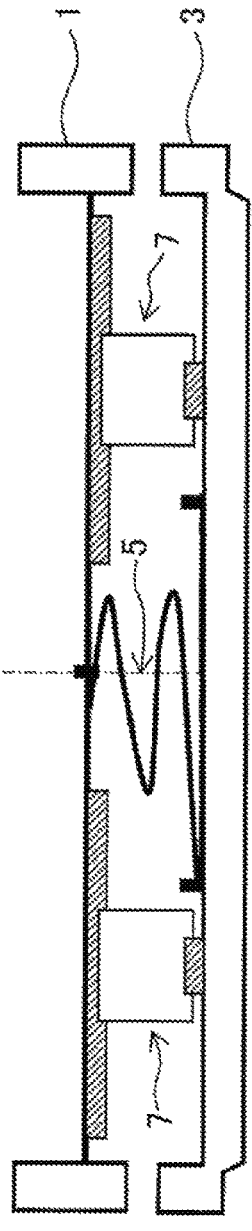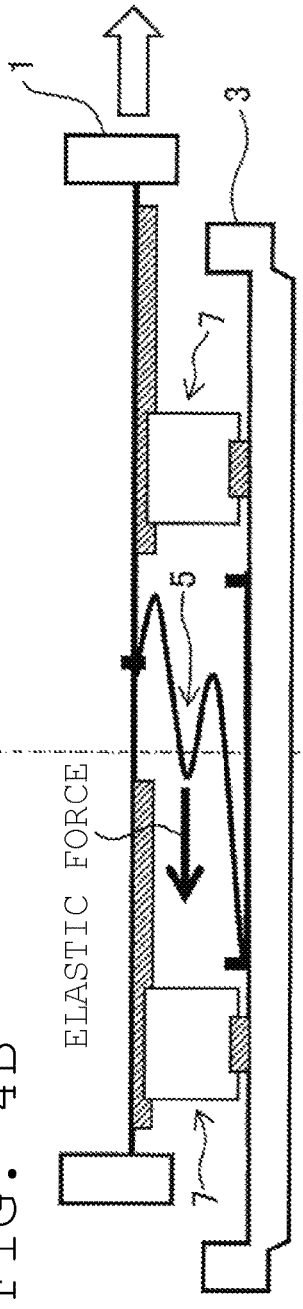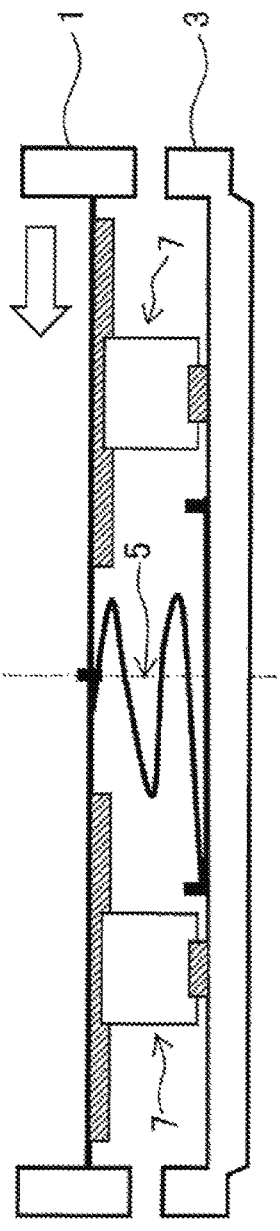

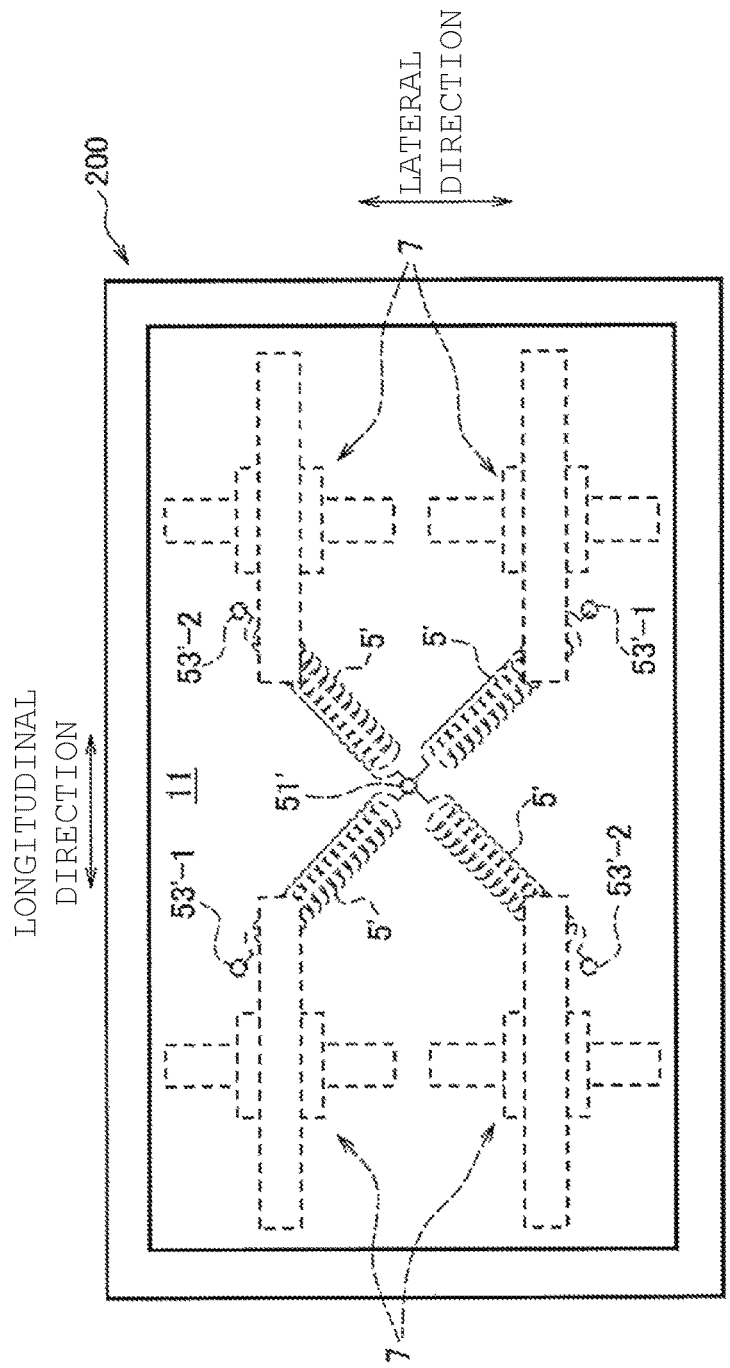
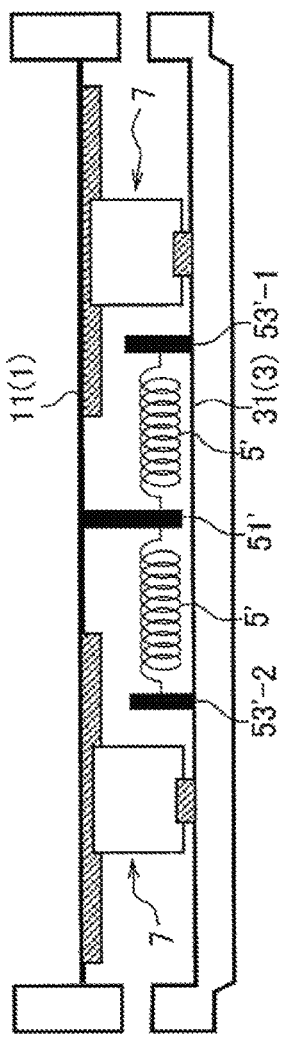

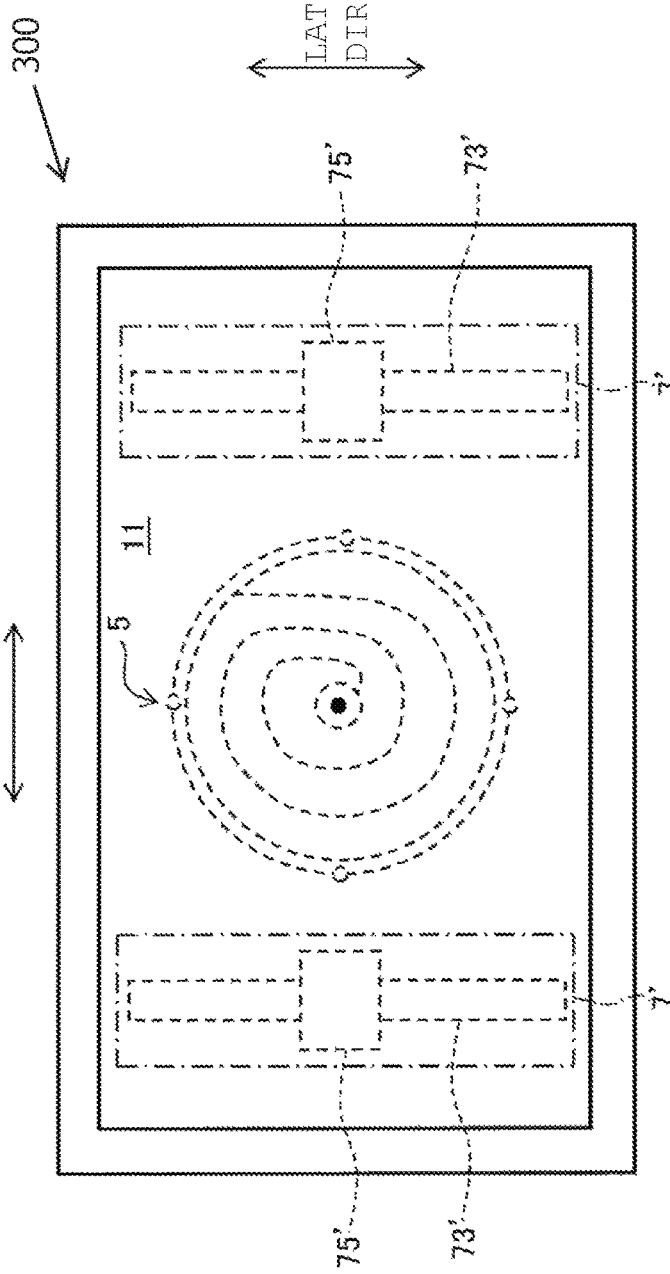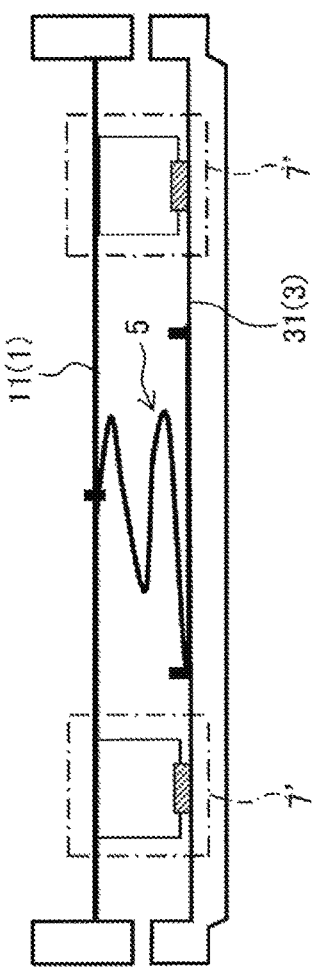
FIG. 6A
FIG. 6B

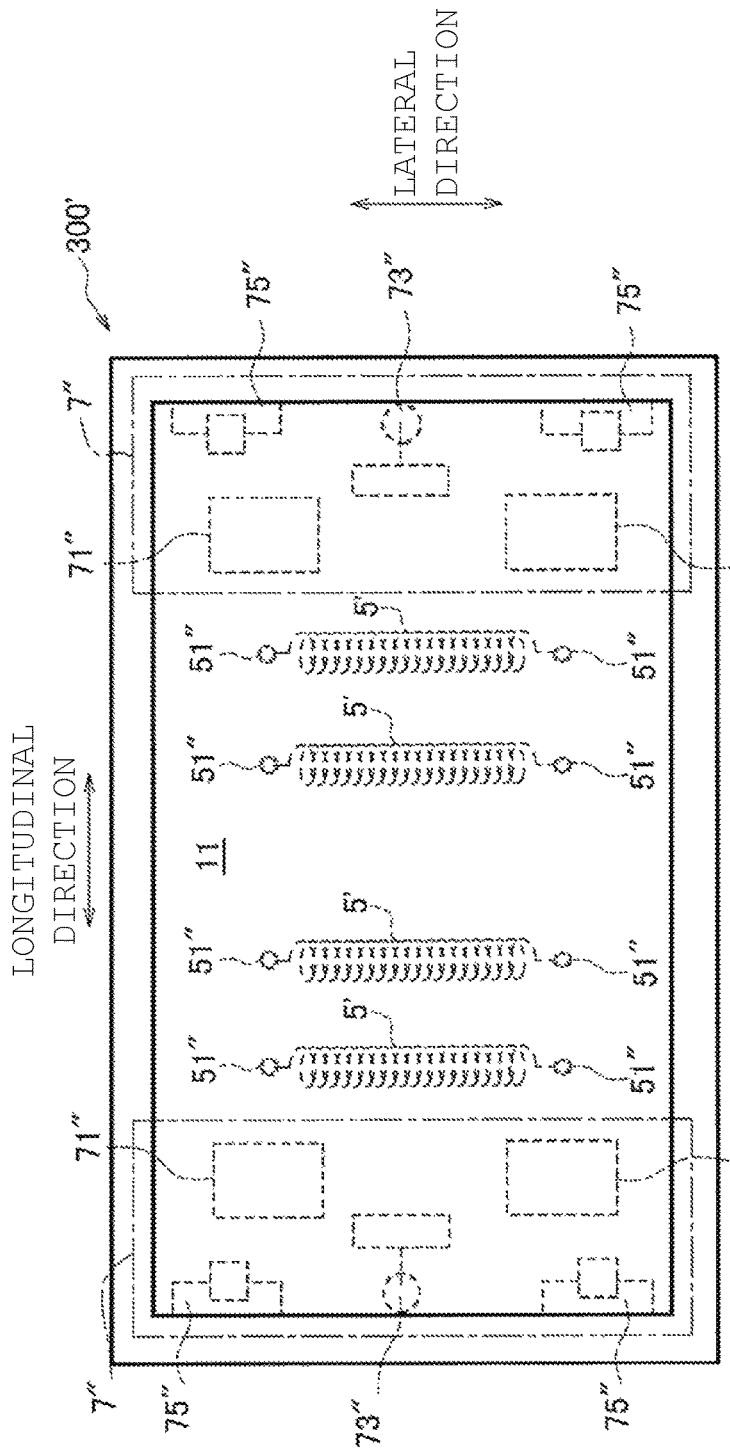
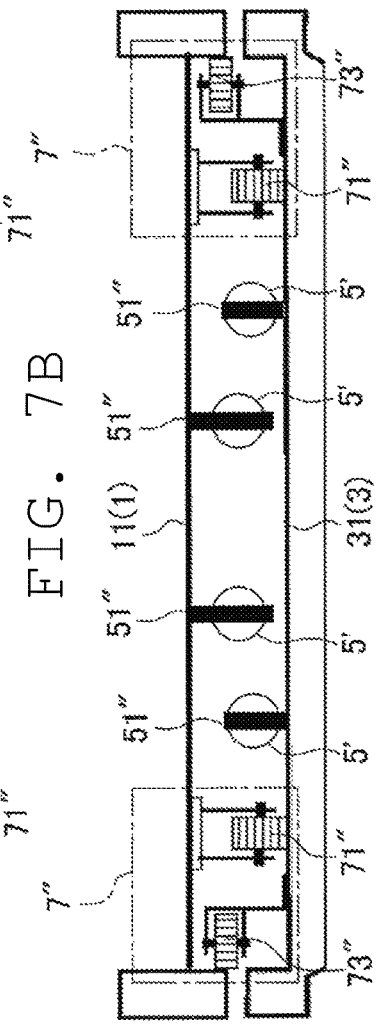

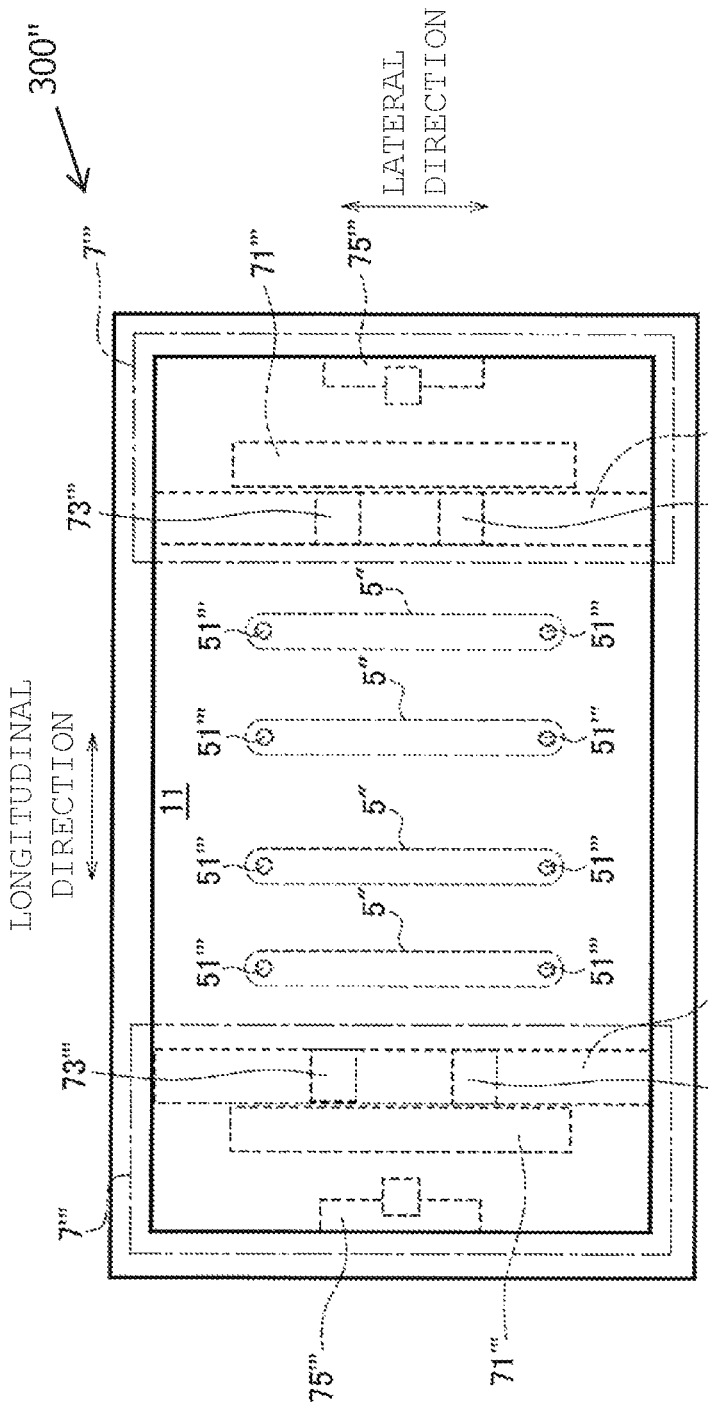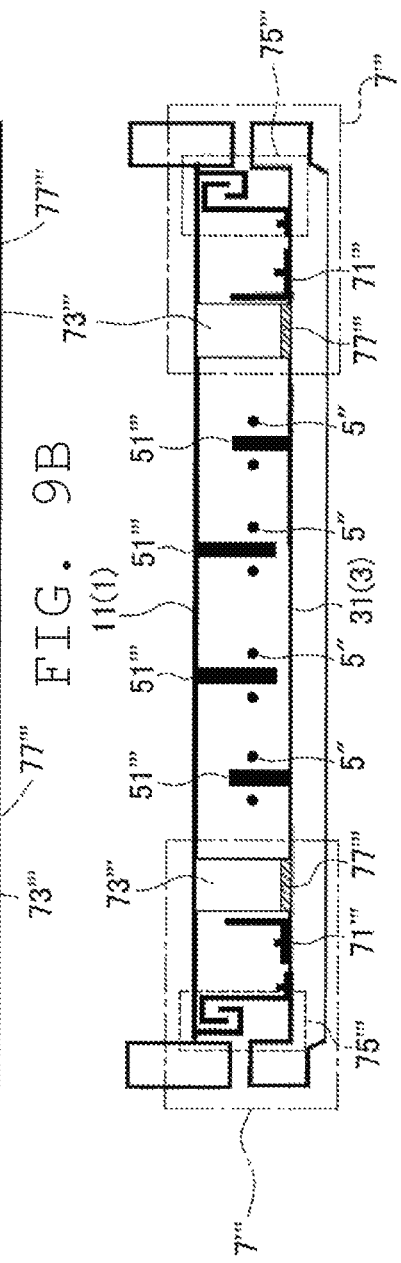

VIBRATION ISOLATOR

CROSS REFERENCE TO RELATED APPLICATIONS

This application claims the benefit of priority to Japanese Patent Application No. 2016-174477 filed on Sep. 7, 2016. The entire contents of this application are hereby incorporated herein by reference.

BACKGROUND OF THE INVENTION

1. Field of the Invention

The present invention relates to a vibration isolator for stackable storage containers which are able to accommodate and store luggage.

2. Description of the Related Art

Conventionally, there has been known a technique where luggage or a plurality of storage containers (for example, foldable containers and buckets) for accommodating and storing a plurality of pieces of luggage are stored in a warehouse in a stacked manner. For example, EP 0767113 B discloses a technique of storing luggage in a stacked manner using a picking system.

For example, when a floor surface shakes due to the occurrence of an earthquake or the like, there may be a case where stacked luggage or stacked storage containers move due to shaking of the floor surface so that the stacked luggage or the stacked storage containers fall, which may the luggage to collapse. When a collapse of luggage occurs due to falling of the storage containers, damage may occur to the luggage or the luggage accommodated in the storage container.

There may be also a case where stacked luggage or stacked storage containers are moved from the position where the luggage or the storage containers are arranged previously. When an arrangement position of the stacked luggage or the stacked storage containers is displaced, a picking system cannot accurately stack luggage or a storing container which the picking system holds, on the stacked luggage or the stacked storage containers.

Accordingly, in storing stacked luggage or stacked storing containers in a state where the stacked luggage or the stacked storing containers are placed on a floor surface, it is necessary to avoid the occurrence of a collapse of the luggage or the storing containers, and also to avoid the excessive movement of the stacked luggage or the stacked storage containers which may be caused due to shaking of the floor surface.

SUMMARY OF THE INVENTION

Preferred embodiments of the present invention provide vibration isolators that significantly reduce or prevent the occurrence of a collapse of storage containers, and movement of the storage containers from a desired position when storage containers accommodating and storing the luggage are stacked with each other.

Hereinafter, plural aspects of various preferred embodiments of the present invention will be described. These aspects of the various preferred embodiments of the present invention can be combined with each other arbitrarily when necessary.

According to an aspect of a preferred embodiment of the present invention, a vibration isolator that is capable of being stacked together with stackable storage containers in which luggage is placed includes an upper member; a lower member; a moving mechanism; and an elastic member. The upper member has a first storage container placed thereon. The lower member is placed on a floor surface or on an upper side of a second storage container. The moving mechanism makes the upper member movable relative to the lower member from a position of origin in a horizontal direction parallel or substantially parallel to a surface of the upper member and a surface of the lower member. The elastic member makes the upper member return to the position of origin by an elastic force responsive to a moving amount of the upper member from the position of origin in the movement of the upper member relative to the lower member.

Due to the provision of the moving mechanism, in the above-mentioned vibration isolator, when a floor surface on which the storage containers are stacked moves or vibrates due to the occurrence of an earthquake or the like, the upper member is able to move relative to the lower member in accordance with the movement or shaking of the floor surface.

Further, the elastic member makes the upper member return to the position of origin (a position of the upper member when the upper member is not moved relative to the lower member) by an elastic force responsive to a moving amount of the upper member relative to the lower member. Accordingly, the upper member is able to be held in the vicinity of the position of origin so that it is possible to significantly reduce or prevent the movement of the storage containers placed on the upper member. As a result, it is possible to prevent a collapse of stacked storage containers and a change in the arrangement position of the storage containers.

A sum of a height of the lower member and a height of the upper member may be set smaller than a height of the storage container. With such a configuration, when the storage container is stacked by being placed on the vibration isolator, it is possible to prevent a height of the stacked storage container from becoming excessively large.

Each of the upper member and the lower member may include a plate member to mount the moving mechanism and the elastic member. With such a configuration, the moving mechanism and the elastic member are easily mounted on the upper member and the lower member.

The moving mechanism may include a first rail member, a second rail member, and a slide member. The first rail member is a rail member which is fixed to one of the upper member or the lower member and extends in a longitudinal direction. The second rail member is a rail member which is fixed to the other of the upper member or the lower member and extends in a lateral direction perpendicular or substantially perpendicular to the longitudinal direction. The slide member supports the first rail member and the second rail member in a slidable manner. With such a configuration, the slide member makes the upper member movable relative to the lower member in the longitudinal direction and the lateral direction while connecting the upper member and the lower member to each other.

In such a configuration, one end of the elastic member is fixed to a center position of one of the upper member or the lower member to which the first rail member is fixed. On the other hand, the other end of the elastic member is fixed to the other of the upper member or the lower member to which the second rail member is fixed such that the other end of the elastic member is arranged at a position different from a position of the first rail member in a height direction.

With such a configuration, the moving mechanism prevents the removal of the upper member from the lower member, and allows the movement of the upper member relative to the lower member with two degrees of freedom.

Further, by fixing one end and the other end of the elastic member as described above, it is possible to arrange the elastic member by effectively making use of a limited space while preventing the interference of the elastic member with the rail members and ensuring a stroke of the elastic member. As a result, it is possible to provide a compact vibration isolator.

The other end of the elastic member may be fixed to the other of the upper member or the lower member to which the second rail member is fixed, at a position farther from the center position than at a position which corresponds to an arrangement position of the first rail member. With such a configuration, the elastic member ensures a larger stroke.

The moving mechanism may include: four first rail members fixed to four corners of one of the upper member or the lower member; four second rail members fixed to four corners of the other of the upper member or the lower member; and four slide members which make the upper member movable relative to the lower member in a longitudinal direction and in a lateral direction while connecting the upper member and the lower member to each other by supporting one of the first rail members and one of the second rail members which corresponds to the one first rail member and which intersects with the one first rail member in a slidable manner.

By providing four first rail members, four second rail members, and four slide members at four corners respectively, it is possible to ensure a balance in the movement of the upper member relative to the lower member.

The elastic member may include a spiral spring having a spiral shape where a radius of the spiral shape is increased from a center at which one end of the elastic member is disposed toward an outer periphery at which the other end of the elastic member is disposed. With such a configuration, by using one elastic member, it is possible to generate an elastic force that causes the upper member return to the position of origin against the movement of the upper member relative to the lower member in an arbitrary direction.

The spiral spring may have a predetermined thickness and a planar shape parallel or substantially parallel to a radial direction of the spiral shape before the spiral spring is mounted on the upper member and the lower member. With such a configuration, the spiral spring is able to be easily fixed to the upper member and the lower member.

The other end of the elastic member on an outer peripheral side of the spiral spring may include a circular member. With such a configuration, the spiral spring is able to be stably fixed to the upper member and the lower member.

The elastic member may be a member which generates an elastic force in a length direction. With such a configuration, it is possible to generate an elastic force against the relative movement of the upper member using a more generally-used elastic member.

The elastic member may include four elastic members. Each of four elastic members may include one end thereof in the length direction fixed to one point at a center position of the upper member or the lower member. With such a configuration, each of the elastic members generate an elastic force in a well-balanced manner against the relative movement of the upper member in an arbitrary direction. Further, a stroke length of each of the elastic members is ensured.

The elastic member may be arranged such that the length direction of the elastic member is directed radially in a surface direction of the upper member or the lower member. With such a configuration, a stroke length of the elastic members is ensured.

The vibration isolator may further include a mounting member by which the elastic member is mounted such that the length direction of the elastic member becomes parallel or substantially parallel to the upper member or the lower member. With such a configuration, it is possible to provide a compact vibration isolator while avoiding the interference between the moving mechanism and the elastic member when the upper member is moved relative to the lower member.

The elastic members may be arranged in point symmetry with respect to the center position of the upper member and the lower member. With such a configuration, it is possible to avoid the rotation of the upper member relative to the lower member caused due to the balanced rotation of the elastic member.

According to preferred embodiments of the present invention, it is possible to significantly reduce or prevent the occurrence of a collapse of stacked storage containers and the movement of the stacked storage containers from the arrangement position of the stacked storage containers.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a view illustrating one example of a state where a plurality of storage containers are stacked with each other.

FIGS. 2A and 2B are views illustrating the detailed configuration of a vibration isolator according to a first preferred embodiment of the present invention.

FIGS. 4A to 4C are views schematically illustrating a vibration isolating operation performed by the vibration isolator according to the first preferred embodiment of the present invention.

FIGS. 5A and 5B are views illustrating the configuration of a vibration isolator according to a second preferred embodiment of the present invention.

FIGS. 6A and 6B are views illustrating one example of a configuration of a vibration isolator according to a third preferred embodiment of the present invention.

FIGS. 7A and 7B are views illustrating the configuration of a vibration isolator according to an alternative preferred embodiment 1 of the third preferred embodiment of the present invention.

FIGS. 9A and 9B are views illustrating the configuration of a vibration isolator according to an alternative preferred embodiment 2 of the third preferred embodiment of the present invention.

DETAILED DESCRIPTION OF THE PREFERRED EMBODIMENTS

First Preferred Embodiment

Figure 3:
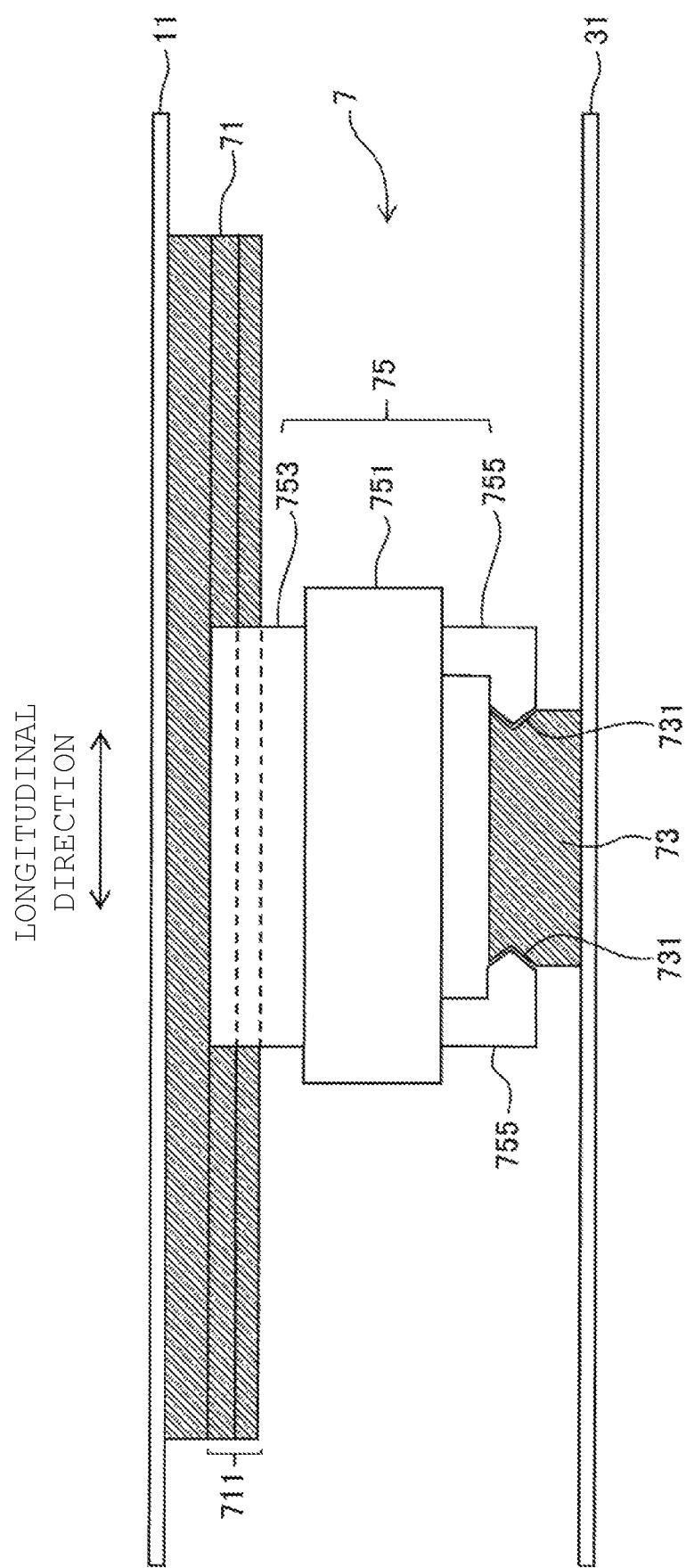
FIG. 3 is a view illustrating the detailed configuration of a moving mechanism according to the first preferred embodiment of the present invention.

Hereinafter, a vibration isolator 100 according to a first preferred embodiment of the present invention will be described. As illustrated in FIG. 1, when a plurality of storage containers B in each of which (a plurality of) luggage A are placed are stacked, the vibration isolator 100 is placed on a floor surface F or is stacked together with the storage containers B so that the vibration isolator 100 significantly reduces or prevents the transmission of shaking or movement of the floor surface F or the like to the stacked storage containers B. Accordingly, it is possible to prevent the plurality of stacked storage containers B from being shaken with an extremely large amplitude due to shaking or movement of the floor surface F or the like. As a result, it is possible to significantly reduce or prevent the occurrence of a collapse of the storage containers B and the displacement of an arrangement position of the storage containers B.

As illustrated in FIG. 1, with respect to the stacked storage containers B, one vibration isolator 100 is located between the storage container B disposed at the lowermost position and the floor surface F. With respect to the stacked storage containers B, one vibration isolator 100 is provided for every predetermined number of storage containers B (for every three storage containers in FIG. 1). Besides such arrangements, with respect to the stacked storage containers B, the vibration isolator 100 may be provided for every storage container B.

The number of storage containers B for which one vibration isolator 100 is arranged may be suitably determined based on, for example, a shape (height) of the storage containers B, an amount of luggage A placed in each storage container B, or the like.

Next, a specific configuration of the vibration isolator 100 according to the first preferred embodiment is described with reference to FIGS. 1, 2A and 2B. FIG. 1 is a view illustrating one example of a state where the plurality of storage containers are stacked with each other. FIGS. 2A and 2B are views illustrating the detailed configuration of the vibration isolator according to the first preferred embodiment. FIG. 2A is a plan view of the vibration isolator 100 as viewed from an upper member 1 (described later), and FIG. 2B is a cross-sectional view of the vibration isolator 100.

The vibration isolator 100 includes the upper member 1. The upper member 1 is a member on which a projecting portion which conforms to a shape of a bottom portion of a first storage container B1 (storage container B) is provided. That is, the upper member 1 has the same shape as the bottom portion of the first storage container B1 (storage container B). A groove located on the bottom portion of the first storage container B1 (storage container B) is brought into contact with the projecting portion of the upper member 1 so that the first storage container B1 (storage container B) is placed on the upper member 1 in a state where the upper member 1 supports the first storage container B1 (storage container B) from the bottom portion.

The vibration isolator 100 includes a lower member 3. As illustrated in FIGS. 2A and 2B, a recessed portion which conforms to a shape of an upper side of a second storage container B2 (FIG. 1) is provided on a lower end portion of the lower member 3. That is, the lower member 3 has the same shape as the upper side of the second storage container B2 (storage container B). An upper side of a wall of the storage container B2 is brought into contact with the recessed portion of the lower member 3 so that the lower member 3 is placed on the storage container B2 in a state where the lower member 3 is supported on the upper side of the wall of the storage container B2. When the vibration isolator 100 is arranged below the stacked storage containers B, as illustrated in FIG. 1, the lower member 3 is placed on the floor surface F.

Between the stacked storage containers B1, B2, as described above, one storage container B1 is placed on the upper member 1, and the lower member 3 is placed on the upper side of another storage container B2. Accordingly, as illustrated in FIG. 1, the vibration isolator 100 is stacked together with the storage containers B in a state where the vibration isolator 100 is sandwiched between two storage containers B (B1, B2).

With such a configuration, the vibration isolator 100 allows the movement of the storage container B (B1) placed on the upper member 1 relative to the storage container B (B2) which is disposed below the lower member 3 so that it is possible to significantly reduce or eliminate the transmission of shaking or movement transmitted from the floor surface F or the like to the storage containers B stacked on the vibration isolator 100.

As illustrated in FIG. 1, a sum of a height of the upper member 1 and a height of the lower member 3 (a height of the vibration isolator 100) is set smaller than a height of the storage container B. With such a configuration, it is possible to avoid a state where a stack height of the plurality of stacked storage containers B becomes excessively large because of the height of the vibration isolator 100.

A storage container transfer device (not illustrated in the drawing) can transfer the plurality of storage containers B and the (plurality of) vibration isolators 100 together simultaneously in a state where the plurality of storage containers B and the (plurality of) vibration isolators 100 are stacked with each other as illustrated in FIG. 1.

As illustrated in FIGS. 2A and 2B, the upper member 1 includes an upper plate member 11, and the lower member 3 includes a lower plate member 31. The upper plate member 11 and the lower plate member 31 are provided to mount an elastic member 5 and moving mechanisms 7 on the upper member 1 and the lower member 3. With such a configuration, the elastic member 5 and the moving mechanisms 7 are able to be easily mounted on the upper member 1 and the lower member 3.

It is sufficient for the upper plate member 11 and the lower plate member 31 to have a configuration where at least portions of the upper and lower plate members 11, 31 on which the elastic member 5 and the moving mechanisms 7 are mounted have a plate shape. Accordingly, the upper plate member 11 and the lower plate member 31 may respectively be a plate member which covers the whole surface of the upper member 1 or the whole surface of the lower member 3, or may respectively be a plate member which covers only portions on which the elastic member 5 and the moving mechanisms 7 are mounted.

The vibration isolator 100 includes the elastic member 5. The elastic member 5 is a member which generates an elastic force responsive to a moving amount of the upper member 1 from a position of origin when the upper member 1 is moved relative to the lower member 3. One end of the elastic member 5 is fixed to the upper member 1 and the other end of the elastic member 5 is fixed to the lower member 3 such that an elastic force becomes zero (that is, the elastic member 5 is in a balanced state) when the upper member 1 is at the position of origin relative to the lower member 3.

The position of origin is determined based on a positional relationship between the upper member 1 and the lower member 3 which is preferably satisfied so that the vibration isolator 100 receives no shaking or vibration. In this preferred embodiment, as illustrated in FIGS. 2A and 2B, the position of origin is defined as the position of the upper member 1 relative to the lower member 3 when the upper member 1 and the lower member 3 agree with each other in the horizontal direction.

As illustrated in FIGS. 2A and 2B, in this preferred embodiment, the elastic member 5 includes a spiral spring having a spiral shape where a radius of the spiral shape is increased from a center at which one end of the elastic member 5 is disposed toward an outer periphery at which the other end of the elastic member 5 is disposed. The elastic member 5 includes: a spiral member 51 which generates an elastic force due to the deformation of the spiral shape; a first mounting plate member 53 provided on the center side of the spiral shape of the spiral member 51 (one end of the elastic member 5); and a second mounting plate member 55 provided on the outer peripheral side of the spiral shape (the other end of the elastic member 5).

By providing the elastic member 5 with the spiral spring, with the use of one elastic member 5, it is possible to generate an elastic force that causes the upper member 1 to return to the position of origin against the movement of the upper member 1 relative to the lower member 3 in the arbitrary direction.

The elastic member 5 defined by the spiral spring has, in a state where the elastic member 5 is not yet mounted on the upper member 1 and the lower member 3, a predetermined thickness and a planar shape parallel or substantially parallel to the radial direction of the spiral shape. The predetermined thickness of the elastic member 5 defined by the spiral spring is one of parameters used in determining a spring constant of the elastic member 5. Accordingly, the predetermined thickness of the elastic member 5 may be determined by taking into account weights or the like of the luggage A and the storage container B. In this preferred embodiment, the predetermined thickness may be set to about 8 mm to about 12 mm, for example.

In mounting the elastic member 5 having such a configuration on the upper member 1 and the lower member 3, the first mounting plate member 53 and the second mounting plate member 55 each having a planar shape are fixed to upper member 1 and the lower member 3 such that the first mounting plate member 53 and the second mounting plate member 55 are parallel or substantially parallel to the upper plate member 11 and the lower plate member 31. With such a configuration, the elastic member 5 is easily fixed to the upper plate member 11 and the lower plate member 31. In particular, the elastic member 5 is able to generate an elastic force responsive to the relative movement of the upper member 1 in the horizontal direction parallel or substantially parallel to the surface direction of the upper member 1 and the lower member 3. As a result, it is possible to significantly reduce or eliminate the relative movement of the upper member 1 in the horizontal direction.

As illustrated in FIGS. 2A and 2B, in this preferred embodiment, the second mounting plate member 55 provided on the outer peripheral side of the spiral spring has an annular circular shape. With such a configuration, as illustrated in FIGS. 2A and 2B, for example, the second mounting plate member 55 is able to be fixed at four points which are equidistantly away from the center of the spiral spring.

Accordingly, the elastic member 5 defined by the spiral spring is able to be stably fixed to the upper member 1 and the lower member 3.

In the example illustrated in FIGS. 2A and 2B, four first rail members 71 (described later) are mounted on the upper plate member 11 and extend in the longitudinal direction, for example. An arrangement distance between the first rail members 71 in the lateral direction perpendicular or substantially perpendicular to the longitudinal direction is set smaller than a diameter of the second mounting plate member 55.

In such a case, as illustrated in FIGS. 2A and 2B, the first mounting plate member 53 (one end side of the elastic member 5) which is disposed on the center side of the spiral shape is fixed at a center position of the upper plate member 11 to which the first rail members 71 are fixed.

On the other hand, the second mounting plate member 55 (the other end side of the elastic member 5) which is disposed on the outer peripheral side of the spiral shape is fixed to the lower plate member 31 to which the second rail members 73 (described later) extending in the lateral direction are fixed such that the second mounting plate member 55 is located at the position different from a position of the first rail members 71 in the height direction.

With such a configuration, it is possible to arrange the elastic member 5 by effectively making use of a limited space in the vibration isolator 100 while preventing the interference of the elastic member 5 with the first rail members 71 and the second rail members 73 and ensuring a stroke of the elastic member 5. As a result, it is possible to provide the compact vibration isolator 100.

Although not illustrated in the drawing, in the case where, opposite to the above-mentioned configuration, four first rail members 71 extending in the longitudinal direction are fixed to the lower plate member 31, and four second rail members 73 extending in the lateral direction are fixed to the upper plate member 11, the first mounting plate member 53 is fixed to a center position of the lower plate member 31, and the second mounting plate member 55 is fixed to the upper plate member 11 such that the second mounting plate member 55 is located at the position different from the position of the first rail members 71 in the height direction.

The vibration isolator 100 preferably includes four moving mechanisms 7 arranged at four corners of the rectangular or substantially rectangular upper member 1 and the rectangular lower member 3. By arranging the moving mechanisms 7 at four corners respectively, it is possible to ensure a balance in the movement of the upper member 1 relative to the lower member 3. Each of the moving mechanisms 7 in this preferred embodiment is a linear guide which is movable in two directions. Specifically, as illustrated in FIG. 3, the moving mechanisms 7 include: four first rail members 71; four second rail members 73; and four slide members 75. FIG. 3 is a view illustrating the detailed configuration of the moving mechanism according to the first preferred embodiment.

Four first rail members 71 extend in the longitudinal direction. Four first rail members 71 are rail members which are fixed to the upper plate member 11 on a side which faces the lower plate member 31 at four corners disposed more outside in the lateral direction than the center position of the upper plate member 11. First slide grooves 711 extending in the longitudinal direction are provided on side surfaces of the first rail member 71 on a side close to the lower plate member 31.

Four second rail members 73 are fixed to the lower plate member 31 on a side which faces the upper plate member 11 at four corners disposed more outside in the longitudinal direction than the center position of the lower plate member 31. Each second rail member 73 is a rail member extending in the lateral direction so as to intersect with at least a portion of the corresponding first rail member 71. Second slide grooves 731 extending in the lateral direction are provided on side surfaces of the second rail member 73 on a side close to the upper plate member 11.

Each of four slide members 75 is a member which slides on the corresponding first rail member 71 and the corresponding second rail member 73. Specifically, each slide member 75 includes: a spacer portion 751; a pair of first pawl portions 753; and a pair of second pawl portions 755.

The spacer portion 751 is a member to which the pair of first pawl portions 753 and the pair of second pawl portions 755 are fixed, and the spacer portion 751 has a predetermined thickness in the height direction to determine a distance between the upper member 1 and the lower member 3 in the height direction.

The pair of first pawl portions 753 are arranged on an upper side of the spacer portion 751 with a distance between the pair of first pawl portions 753 set substantially equal to a width of the first rail member 71. A distal end of each first pawl portion 753 has a shape which corresponds to a cross-sectional shape of the first slide groove 711 (for example, a triangular or substantially triangular shape in this preferred embodiment), and is fitted in the first slide groove 711 in a slidable manner.

With such a configuration, the first rail member 71 is supported by the pair of first pawl portions 753 above the spacer portion 751, and allows the spacer portion 751 to slide in the longitudinal direction.

The pair of second pawl portions 755 are arranged on a lower side of the spacer portion 751 with a distance between the pair of second pawl portions 755 set equal or substantially equal to a width of the second rail member 73. A distal end of each second pawl portion 755 has a shape which corresponds to a cross-sectional shape of the second slide groove 731 (for example, a triangular or triangular shape in this preferred embodiment), and is fitted in the second slide groove 731 in a slidable manner.

With such a configuration, the second rail member 73 is supported by the pair of second pawl portions 755 below the spacer portion 751, and allows the spacer portion 751 to slide in the lateral direction.

With the above-mentioned configuration, each of four slide members 75 supports one corresponding first rail member 71 in a slidable manner on an upper portion of the slide member 75. Further, each of four slide members 75 supports one second rail member 73 which intersects with one corresponding first rail member 71 in a slidable manner on a lower portion of the slide member 75. As a result, while each slide member 75 connects the upper member 1 and the lower member 3 with each other, each slide member 75 makes the upper member 1 movable relative to the lower member 3 in two directions consisting of the longitudinal direction and the lateral direction which extend in the horizontal direction parallel or substantially parallel to a surface of the upper member 1 and a surface of the lower member 3.

As a result, the moving mechanism 7 having the above-mentioned configuration prevents the removal of the upper member 1 from the lower member 3. Further, the moving mechanism 7 allows the movement of the upper member 1 relative to the lower member 3 with two degrees of freedom. That is, the moving mechanism 7 allows the movement of the upper member 1 relative to the lower member 3 in the arbitrary direction in a horizontal plane.

By providing four first rail members 71, four second rail members 73 and four slide members 75 (that is, by arranging four sets of moving mechanisms) at four corners respectively, it is possible to ensure a balance in the movement of the upper member 1 relative to the lower member 3.

In the moving mechanism 7 having the above-mentioned configuration, each slide member 75 supports the first rail member 71 and the second rail member 73 using the pair of first pawl portions 753, the pair of second pawl portions 755, the first slide grooves 711 and the second slide grooves 731. With such a configuration, it is possible to significantly reduce or prevent the rotation of the first rail member 71 and the second rail member 73 relative to the slide member 75. As a result, it is possible to significantly reduce or prevent the rotation of the upper member 1 relative to the lower member 3.

As an alternative preferred embodiment of the linear guide, the spacer portion 751 may include a top portion of the first rail member 71 or a bottom portion of the second rail member 73. With such a configuration, an upper linear guide and a lower linear guide are able to be defined by an integral body.

Next, a vibration isolating operation performed by the vibration isolator 100 according to the first preferred embodiment having the above-mentioned configuration will be described with reference to FIGS. 4A to 4C. FIGS. 4A to 4C are views schematically illustrating a vibration isolating operation performed by the vibration isolator according to the first preferred embodiment.

As described above, the elastic member 5 is mounted on the upper member 1 and the lower member 3 such that an elastic force becomes zero (the elastic member 5 is in a balanced state) when the upper member 1 is at the position of origin. Accordingly, when there is no shaking transmitted from the floor surface F or the like, as illustrated in FIG. 4A, the upper member 1 is held stationary at the position of origin (the position where the upper member 1 and the lower member 3 agree with each other in the horizontal direction).

When shaking or movement of the floor surface F or the like occurs in a state where the upper member 1 is held stationary at the position of origin, a kinetic energy generated by the shaking is applied to the upper member 1 and the storage containers B (and the luggage A accommodated in each storage container B) placed on the upper member 1. Due to the kinetic energy, as illustrated in FIG. 4B, the moving mechanism 7 moves the upper member 1 relative to the lower member 3.

Due to the relative movement of the upper member 1, the position where one end of the elastic member 5 is fixed is moved so that the elastic member 5 is deformed such that the elastic member 5 generates an elastic force for making the elastic member 5 return to an original shape (a balanced state) (that is, an elastic force for making the upper member 1 return to the position of origin). When an elastic energy corresponding to a kinetic energy applied to the upper member 1 and the storage containers B is stored in the elastic member 5, the deformation of the elastic member 5 is stopped.

In this preferred embodiment, a degree of deformation of the elastic member 5 caused by the relative movement of the upper member 1 depends on a spring constant of the elastic member 5. Accordingly, the spring constant of the elastic member 5 is set to a proper value based on a weight of the upper member 1, a weight of the storage containers B placed on the upper member 1 (a sum of an own weight of the storage containers B and a weight of luggage A accommodated in each storage container B) or the like, for example.

For example, when a weight of the storage containers B is large, by setting a spring constant to a large value, it is possible to significantly reduce or prevent the generation of the excessively large relative movement of the upper member 1 and hence, it is possible to avoid shaking or movement of the storage containers B with a large amplitude.

On the other hand, when a weight of the storage containers B is small, it is preferable to select the elastic member 5 having a small spring constant such that the elastic member 5 is deformed even by storage containers B having a small weight. This is because, in the case where a spring constant is excessively large, even when a kinetic energy is applied to the storage containers B, the elastic member 5 is not deformed so that the kinetic energy generated by shaking or movement is directly applied to the storage containers B. As a result, the storage containers B may move or collapse.

When shaking or movement of the floor surface F or the like stops, as illustrated in FIG. 4C, the upper member 1 is moved in the direction toward the position of origin by an elastic energy stored in the elastic member 5. Thereafter, the upper member 1 vibrates for a while in the vicinity of the position of origin depending on the situation and, then, returns to the position of origin.

The elastic member 5 makes the upper member 1 return to the position of origin by an elastic force responsive to a moving amount of the upper member 1 relative to the lower member 3. Accordingly, the upper member 1 can be held in the vicinity of the position of origin so that the movement of the storage containers B placed on the upper member 1 is significantly reduced or prevented. That is, a vibration isolating effect is applied to the storage containers B.

Second Preferred Embodiment

A vibration isolator 200 according to a second preferred embodiment of the present invention is a vibration isolator where the spiral spring of the above-mentioned vibration isolator 100 according to the first preferred embodiment is replaced with four members (coil springs 5' (for example, tension springs, compression springs, tension compression springs)) which generate an elastic force in the length direction as illustrated in FIGS. 5A and 5B. As the member which generates an elastic force in the length direction, a rubber product such as rubber bands may be used other than the coil springs 5'. FIGS. 5A and 5B are views illustrating the configuration of the vibration isolator according to the second preferred embodiment.

The vibration isolator 200 according to the second preferred embodiment has substantially the same configuration as the vibration isolator 100 according to the first preferred embodiment except that the spiral spring is replaced with the coil springs 5'. Accordingly, hereinafter, the description of elements other than the elastic member 5 (coil springs 5') is omitted.

In this preferred embodiment, as illustrated in FIGS. 5A and 5B, an upper plate member 11 includes a first mounting member 51' extending in the direction perpendicular to a surface of the upper plate member 11 from a center position of the upper member 1. On the other hand, a lower plate member 31 includes a pair of second mounting members 53'-1 and a pair of third mounting members 53'-2 at positions on the lower plate member 31 farther from the center position than positions which correspond to arrangement positions of the first rail members 71. The pair of second mounting members 53'-1 and the pair of third mounting members 53'-2 are arranged on the lower plate member 31. The pair of second mounting members 53'-1 and the pair of third mounting members 53'-extend in the direction perpendicular or substantially perpendicular to a surface of the lower plate member 31, and are arranged in point symmetry with respect to the center position of the lower member 3.

In this preferred embodiment, the elastic member 5 preferably includes four coil springs 5', for example. First ends of four coil springs 5' are fixed to the upper plate member 11 at one point which is the center position of the upper plate member 11 by way of the first mounting member 51'. On the other hand, second ends of the coil springs 5' are fixed to the pair of second mounting members 53'-1 or the pair of third mounting members 53'-such that the coil springs 5' are radially arranged in the surface direction with the length directions of the four coil springs 5' set parallel or substantially parallel to the surface direction of the upper member 1 and the surface direction of the lower member 3.

By fixing the coil springs 5' as described above, first ends of four coil springs 5' are fixed to the upper plate member 11 at one point which is the center position of the upper plate member 11 to which the first rail members 71 are fixed. The second ends of four coil springs 5' are fixed to the lower plate member 31 to which the second rail members 73 are fixed, at positions farther from the center position than the positions which correspond to the arrangement positions of the first rail members 71. With such a configuration, four coil springs 5' ensure a maximum stroke length of the coil springs 5' while generating an elastic force in a well-balanced manner against the relative movement of the upper member 1 in the arbitrary direction.

Four coil springs 5' are arranged radially in the surface direction and in point symmetry with respect to the center position of the upper member 1. With such a configuration, it is also possible to avoid the rotation of the upper member 1 relative to the lower member 3 caused by the balanced rotation of four coil springs 5' while allowing the coil springs 5' to ensure a stroke length.

Further, the coil springs 5' are arranged such that the length directions of the coil springs 5' are parallel or substantially parallel to the surface direction of the upper member 1 or the lower member 3 at the position different from a position of the first rail members 71 extending in the longitudinal direction in the height direction. With such a configuration, it is possible to provide the compact vibration isolator 100 while avoiding the interference between the first rail members 71 and the coil springs 5' when the upper member 1 is moved relative to the lower member 3.

Although not illustrated in the drawing, in the case where, opposite to the above-mentioned configuration, the first rail members 71 extending in the longitudinal direction are fixed to the lower plate member 31, and the second rail members 73 extending in the lateral direction are fixed to the upper plate member 11, the first mounting member 51' extends from the center position of the lower plate member 31. On the other hand, the pair of second mounting members 53'-1 and the pair of third mounting members 53'-2 extend from positions on the upper plate member 11 farther from the center position than positions which correspond to arrangement positions of the first rail members 71.

Eventually, first ends of four coil springs 5' are fixed at one point which is the center position of the lower plate member 31, and second ends of four coil springs 5' are fixed to the upper plate member 11 at positions farther from the center position than the positions which correspond to the arrangement positions of the first rail members 71.

Third Preferred Embodiment

A vibration isolator 300 according to a third preferred embodiment of the present invention may have only a function of isolating vibration against the relative movement of the upper member 1 (storage containers B) in one direction. Specifically, as illustrated in FIGS. 6A and 6B, each moving mechanism 7' which is a linear guide may include only a second rail member 73' extending in the lateral direction and a slide member 75' including a pair of pawls fitted in second slide grooves provided on the second rail member 73' in a slidable manner. FIGS. 6A and 6B are views illustrating one example of a configuration of the vibration isolator according to the third preferred embodiment.

With respect to the vibration isolator according to the third preferred embodiment having the function of isolating vibration against the relative movement of the upper member 1 in one direction, various alternative preferred embodiments are conceivable. Specifically, for example, an alternative preferred embodiment 1 and alternative preferred embodiment 2 described hereinafter are conceivable.

Alternative Preferred Embodiment 1

As illustrated in FIGS. 7A and 7B, a vibration isolator 300' according to the alternative preferred embodiment 1 of the third preferred embodiment includes: four coil springs 5' each having both ends thereof fixed to mounting members 51" such that the length direction of each coil spring 5' extends along the lateral direction; movement assisting mechanisms 71"; movement restricting wheels 73"; and slide mechanisms 75". FIGS. 7A and 7B are views illustrating the configuration of the vibration isolator according to the alternative preferred embodiment 1 of the third preferred embodiment.

In the above-mentioned configuration, the moving mechanism 7" includes the movement assisting mechanisms 71", the movement restricting wheel 73", and the slide mechanisms 75".

The movement assisting mechanism 71" includes a wheel rotatable about a shaft mounted on the lower plate member 31, and assists the relative movement of the upper member 1 in the lateral direction. The movement assisting mechanism 71" may include a ball caster.

The movement restricting wheel 73" includes: a wheel which is brought into contact with an inner wall (an inner side of a wall perpendicular to the upper plate member 11) of the upper member 1; and a fixed member fixed to the lower member 3 so as to pivotally support the wheel in a rotatable manner about a shaft. With such a configuration, the movement restricting wheel 73" restricts the movement of the upper member 1 in the longitudinal direction which differs from the lateral direction.

Figure 8A:
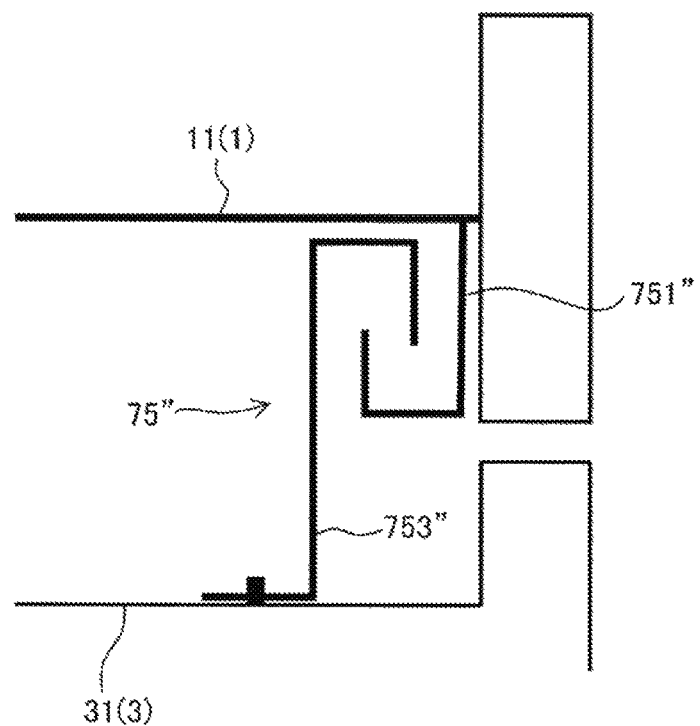
FIGS. 8A and 8B are views illustrating the configuration of a slide mechanism according to the alternative preferred embodiment 1 of the third preferred embodiment of the present invention.
Figure 8B:
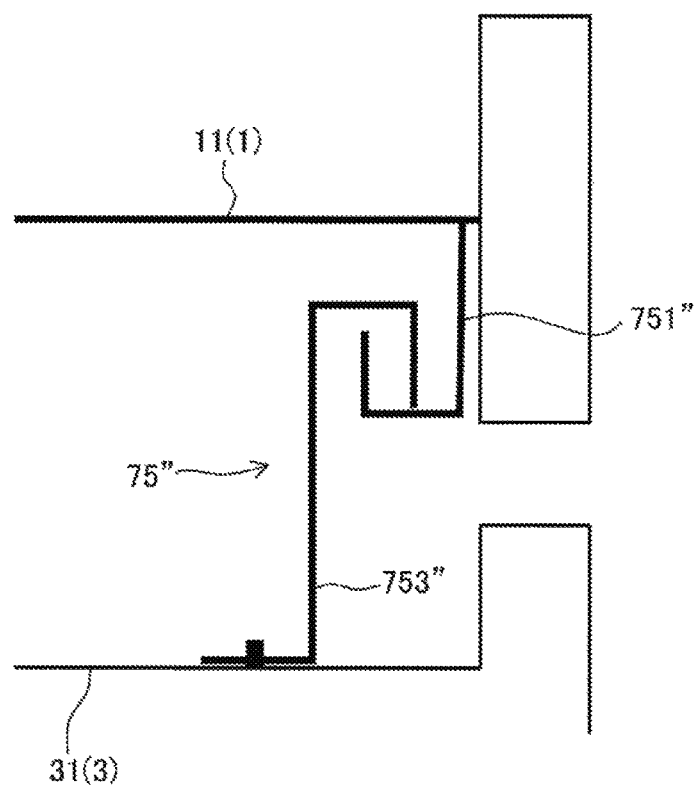

The slide mechanism 75" is a mechanism which makes the upper member 1 movable relative to the lower member 3 in the lateral direction while connecting the upper member 1 to the lower member 3. Specifically, as illustrated in FIG. 8A, the slide mechanism 75" includes: a first member 751" which has a U-shaped groove extending along the lateral direction and is fixed to the upper plate member 11; and a second member 753" which has a distal end thereof defining an insertion wall inserted into the U-shaped groove of the first member 751" and a terminal end thereof fixed to the lower member 3. FIGS. 8A and 8B are views illustrating the configuration of the slide mechanism.

When the upper member 1 is moved relative to the lower member 3 in a state where the insertion wall of the second member 753" is inserted into the U-shaped groove of the first member 751", the relative movement of the upper member 1 is allowed in the lateral direction along which the U-shaped groove extends. The insertion wall is brought into contact with a side wall of the U-shaped groove so that the relative movement of the upper member in the longitudinal direction is restricted. With such a configuration, the slide mechanism 75" makes the upper member 1 movable relative to the lower member 3 only in the lateral direction.

Further, when the upper member 1 is moved relative to the lower member 3 in the upward direction, as illustrated in FIG. 8B, the insertion wall of the second member 753" is brought into contact with a bottom portion of the U-shaped groove of the first member 751". With such a configuration, the slide mechanism 75" restricts the movement of the upper member 1 relative to the lower member 3 in the upward direction and hence, it is possible to avoid the removal of the upper member 1 from the lower member 3. That is, the slide mechanism 75" is able to connect the upper member 1 to the lower member 3.

Alternative Preferred Embodiment 2

On the other hand, as illustrated in FIGS. 9A and 9B, a vibration isolator 300" according to the alternative preferred embodiment 2 of the third preferred embodiment includes: four annular rubber members 5" each mounted so as to wrap around mounting members 51'" disposed inside an annular shape of the annular rubber member 5"; a pair of first restriction members 71'"; four second restriction members 73'"; slide mechanisms 75'" having substantially the same configuration as the configuration of the slide mechanism described with reference to FIG. 8; and a pair of slide assisting plates 77'". FIGS. 9A and 9B are views illustrating the configuration of the vibration isolator according to the alternative preferred embodiment 2 of the third preferred embodiment.

In the above-mentioned configuration, a moving mechanism 7'" includes the first restriction member 71'", the second restriction members 73'", the slide mechanism 75'", and the slide assisting plate 77'". Hereinafter, elements other than the slide mechanism 75'" which is already described above are described.

Each of the pair of first restriction members 71'" is an L-shaped member (for example, metal plate). The first restriction members 71'" extend in the lateral direction, and are fixed to the lower plate member 31 with a predetermined distance therebetween in the longitudinal direction (the first restriction members 71'" being arranged more outside in the longitudinal direction than four annular rubber members 5").

Four second restriction members 73'" are members fixed to the upper plate member 11 such that, in an area disposed more inside than the pair of first restriction members 71'" (and more outside than four annular rubber members 5"), two second restriction members 73'" are brought into contact with one first restriction member 71'", and remaining two second restriction members 73'" are brought into contact with the other first restriction member 71'".

Side surfaces of four second restriction members 73'" are brought into contact with inner sides of the pair of first restriction members 71'" and hence, the movement of the upper member 1 relative to the lower member 3 in the longitudinal direction is restricted.

The slide assisting plates 77''' are plate members (for example, metal plates) which extend in the lateral direction, and are fixed to the lower plate member 31 at positions which correspond to four second restriction members 73'''. With such a configuration, four second restriction members 73''' are allowed to slide on the slide assisting plates 77''' in the lateral direction.

As described above, the second restriction members 73''' slide on surfaces of the first restriction members 71''' and surfaces of the slide assisting plates 77'''. Accordingly, a low-friction member (for example, a fluororesin or the like) may be laminated, or coating or surface processing may be applied to a contact surface of each second restriction member 73''' with the first restriction member 71''' and the slide assisting plate 77'''. Besides such methods, a low-friction member may be laminated, or coating or surface processing may be applied also to contact surfaces of each first restriction member 71''' and each slide assisting plate 77''' with the second restriction member 73'''.

The above-mentioned first to third preferred embodiments preferably have the following configuration and function used in common.

The vibration isolator 100, 200, 300, 300', 300'' (one example of the vibration isolator) is a vibration isolator capable of being stacked together with the stackable storage containers B, B1, B2 (one example of the storage containers) in which luggage A (one example of luggage) is placed. The vibration isolator 100, 200, 300, 300', 300'' includes: the upper member 1 (one example of the upper member); the lower member 3 (one example of the lower member); the moving mechanisms 7, 7', 7'', 7''' (one example of the moving mechanisms); and the elastic member 5 formed of a spiral spring, the coil spring 5' or the annular rubber member 5'' (one example of the elastic member). The first storage container B1 (one example of the first storage container) is placed on the upper member 1. The lower member 3 is placed on the floor surface F (one example of the floor surface) or on an upper side of the second storage container B2 (one example of the second storage container). The moving mechanisms 7, 7', 7'', 7''' make the upper member 1 movable relative to the lower member 3 from the position of origin in the horizontal direction parallel or substantially parallel to a surface of the upper member 1 and a surface of the lower member 3. The elastic member makes the upper member 1 return to the position of origin by an elastic force responsive to a moving amount of the upper member 1 from the position of origin in the movement of the upper member 1 relative to the lower member 3.

Due to the provision of the moving mechanisms 7, 7', 7'', 7''', in the vibration isolator 100, 200, 300, 300', 300'', when a floor surface on which the storage containers B are stacked moves or vibrates due to the occurrence of an earthquake or the like, the upper member 1 is able to move relative to the lower member 3 in accordance with the shaking of the floor surface.

Further, the elastic member makes the upper member 1 return to the position of origin (a position of the upper member 1 when the upper member 1 is not moved relative to the lower member 3) by an elastic force responsive to a moving amount of the upper member 1 relative to the lower member 3. Accordingly, the upper member 1 is able to be held in the vicinity of the position of origin so that it is possible to significantly reduce or prevent the movement of the storage containers B placed on the upper member 1. As a result, it is possible to prevent a collapse of the storage containers B, B1, B2 and a change in the arrangement position of the storage containers B, B1, B2.

OTHER PREFERRED EMBODIMENTS

Although the plurality of preferred embodiments of the present invention have been described heretofore, the present invention is not limited to the above-mentioned preferred embodiments, and various modifications are conceivable without departing from the gist of the present invention. In particular, the plurality of preferred embodiments and alternative preferred embodiments described in this specification may be arbitrarily combined with each other when necessary.

For example, the elastic member and the moving mechanism 7, 7', 7'', 7''' may be suitably combined with each other. For example, the elastic member 5 defined by a spiral spring may be combined with any one of the moving mechanisms 7'', 7'''. Alternatively, the coil spring 5' may be combined with the moving mechanism 7'''. Further, the annular rubber member 5'' may be combined with one of the moving mechanisms 7, 7', 7''.

Shapes of the upper member 1 and the lower member 3 may be suitably changed in conformity with a shape of the storage container B or the vibration isolation direction (the direction along which the movement of the storage containers B is suppressed).

The direction of the movement of the upper member 1 relative to the lower member 3 generated by the moving mechanism 7 may be suitably changed according to the direction along which the movement of the storage containers B is expected to be suppressed.

The spiral spring defining the elastic member 5 in the first preferred embodiment may be formed such that a linear member such as a wire has a spiral shape, for example.

The upper member 1 and the lower member 3 may have an arbitrary shape in conformity with a shape of the storage container B. For example, each of the upper member 1 and the lower member 3 may have a square or substantially square shape (that is, lengths of sides in the longitudinal direction may be equal or substantially equal to lengths of sides in the lateral direction).

The structure or the arrangement of the elastic member and/or the moving mechanisms may be suitably changed depending on shapes of the upper member 1 and the lower member 3.

Preferred embodiments of the present invention are broadly applicable to stackable storage containers each of which can accommodate and store luggage.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration isolator capable of being stacked together with stackable storage containers in which luggage is placed, the vibration isolator comprising:
   an upper member on which a first storage container is placed;
   a lower member placed on a floor surface or on an upper side of a second storage container;
   a moving mechanism which makes the upper member movable relative to the lower member from a position of origin in a horizontal direction parallel or substantially parallel to a surface of the upper member and a surface of the lower member; and
   an elastic member which makes the upper member return to the position of origin by an elastic force responsive to a moving amount of the upper member from the position of origin in the movement of the upper member relative to the lower member; wherein the moving mechanism includes:
a first rail member which is fixed to one of the upper member or the lower member, and extends in a longitudinal direction;
a second rail member which is fixed to the other of the upper member or the lower member, and extends in a lateral direction perpendicular or substantially perpendicular to the longitudinal direction; and
a slide member which supports the first rail member and the second rail member in a slidable manner to make the upper member movable relative to the lower member in the longitudinal direction and the lateral direction while connecting the upper member and the lower member to each other; wherein
a first end of the elastic member is fixed to a center position of one of the upper member or the lower member to which the first rail member is fixed; and
a second end of the elastic member is fixed to the other of the upper member or the lower member to which the second rail member is fixed such that the second end of the elastic member is located at a position different from a position of the first rail member in a height direction.

2. The vibration isolator according to claim 1, wherein a sum of a height of the lower member and a height of the upper member is smaller than a height of the storage container.

3. The vibration isolator according to claim 1, wherein each of the upper member and the lower member includes a plate member to mount the moving mechanism and the elastic member.

4. The vibration isolator according to claim 1, wherein the second end of the elastic member is fixed to the other of the upper member or the lower member to which the second rail member is fixed, at a position farther from the center position than a position which corresponds to an arrangement position of the first rail member.

5. The vibration isolator according to claim 1, wherein
the first rail member includes four first rail members, the second rail member includes four second rail members, and the slide member includes four slide members, and
the moving mechanism includes:
the four first rail members fixed to four corners of one of the upper member or the lower member;
the four second rail members fixed to four corners of the other of the upper member or the lower member; and
the four slide members which make the upper member movable relative to the lower member in the longitudinal direction and the lateral direction while connecting the upper member and the lower member to each other by supporting one of the first rail members and one of the second rail members which corresponds to the one first rail member and which intersects with the one first rail member in a slidable manner.

6. The vibration isolator according to claim 1, wherein the elastic member generates the elastic force in a length direction of the elastic member.

7. A vibration isolator capable of being stacked together with stackable storage containers in which luggage is placed, the vibration isolator comprising:
an upper member on which a first storage container is placed;
a lower member placed on a floor surface or on an upper side of a second storage container;
a moving mechanism which makes the upper member movable relative to the lower member from a position of origin in a horizontal direction parallel or substantially parallel to a surface of the upper member and a surface of the lower member; and
an elastic member which makes the upper member return to the position of origin by an elastic force responsive to a moving amount of the upper member from the position of origin in the movement of the upper member relative to the lower member; wherein
the elastic member includes a spiral spring with a spiral shape where a radius of the spiral shape is increased from a center at which a first end of the elastic member is disposed toward an outer periphery at which a second end of the elastic member is disposed.

8. The vibration isolator according to claim 7, wherein the spiral spring has a predetermined thickness and a planar shape parallel or substantially parallel to a radial direction of the spiral shape before the spiral spring is mounted on the upper member and the lower member.

9. The vibration isolator according to claim 7, wherein the second end of the elastic member on an outer peripheral side of the spiral spring includes a circular member.

10. A vibration isolator capable of being stacked together with stackable storage containers in which luggage is placed, the vibration isolator comprising:
an upper member on which a first storage container is placed;
a lower member placed on a floor surface or on an upper side of a second storage container;
a moving mechanism which makes the upper member movable relative to the lower member from a position of origin in a horizontal direction parallel or substantially parallel to a surface of the upper member and a surface of the lower member; and
an elastic member which makes the upper member return to the position of origin by an elastic force responsive to a moving amount of the upper member from the position of origin in the movement of the upper member relative to the lower member; wherein
the upper member includes a projection that is configured to conform to a bottom portion of the first storage container;
the lower member includes a recess that is configured to conform to an upper portion of the second storage container; and
the upper member and the lower member are a same size when viewed from above.

11. The vibration isolator according to claim 10, wherein
the elastic member includes four elastic members; and
each of the four elastic members has a first end thereof in a length direction fixed to one point at a center position of the upper member or the lower member.

12. The vibration isolator according to claim 11, wherein the elastic member is arranged such that the length direction of the elastic member is directed radially in a surface direction of the upper member or the lower member.

13. The vibration isolator according to claim 10, further comprising a mounting member by which the elastic member is mounted such that a length direction of the elastic member is parallel or substantially parallel to the upper member or the lower member.

14. The vibration isolator according to claim 10, wherein the elastic member is arranged in point symmetry with respect to a center position of the upper member and the lower member.

\* \* \* \* \*